United States Patent
Turgeman et al.

(10) Patent No.: US 9,703,953 B2
(45) Date of Patent: Jul. 11, 2017

(54) METHOD, DEVICE, AND SYSTEM OF DIFFERENTIATING AMONG USERS BASED ON USER CLASSIFICATION

(71) Applicant: BioCatch Ltd., Tel Aviv (IL)

(72) Inventors: Avi Turgeman, Cambridge, MA (US); Uri Rivner, Mazkeret Batya (IL)

(73) Assignee: BioCatch Ltd., Tel Aviv (IL)

( * ) Notice: Subject to any disclaimer, the term of this patent is extended or adjusted under 35 U.S.C. 154(b) by 104 days.

(21) Appl. No.: 14/675,770

(22) Filed: Apr. 1, 2015

(65) Prior Publication Data
US 2015/0205958 A1    Jul. 23, 2015

Related U.S. Application Data

(63) Continuation-in-part of application No. 14/566,723, filed on Dec. 11, 2014, now Pat. No. 9,071,969,
(Continued)

(51) Int. Cl.
*G06F 21/00* (2013.01)
*H04L 29/06* (2006.01)
(Continued)

(52) U.S. Cl.
CPC ........... *G06F 21/554* (2013.01); *G06F 3/041* (2013.01); *G06F 21/31* (2013.01); *G06F 21/316* (2013.01);
(Continued)

(58) Field of Classification Search
CPC ...... G06F 21/554; G06F 21/316; G06F 21/31; G06F 21/32; G06F 3/041;
(Continued)

(56) References Cited

U.S. PATENT DOCUMENTS

| | | | |
|---|---|---|---|
| 2006/0195328 A1* | 8/2006 | Abraham | G06Q 20/204 235/382 |
| 2011/0251823 A1* | 10/2011 | Davis | G06Q 30/02 702/181 |
| 2013/0042111 A1* | 2/2013 | Fiske | H04L 9/3239 713/170 |

FOREIGN PATENT DOCUMENTS

WO    WO 2013188277 A1 * 12/2013    ........... G06N 99/005

OTHER PUBLICATIONS

Daniel Hintze, Rainhard D. Findling, Sebastian Scholz, René Mayrhofer; "Mobile Device Usage Characteristics: The Effect of Context and Form Factor on Locked and Unlocked Usage"; Dec. 2014; MoMM '14: Proceedings of the 12th International Conference on Advances in Mobile Computing and Multimedia; Publisher: ACM; pp. 1-10.*

* cited by examiner

*Primary Examiner* — Kambiz Zand
*Assistant Examiner* — Courtney Fields
(74) *Attorney, Agent, or Firm* — Eitan, Mehulal & Sadot

(57) ABSTRACT

Devices, systems, and methods of detecting user identity, differentiating between users of a computerized service, and detecting a cyber-attacker. An end-user device interacts and communicates with a server of a computerized server (a banking website, an electronic commerce website, or the like). The interactions are monitored, tracked and logged. User Interface (UI) interferences or irregularities are introduced; and the server tracks the response or the reaction of the end-user to such interferences. The system determines whether the user is a legitimate user, or a cyber-attacker or automated script posing as the legitimate user. The system utilizes classification of users into classes or groups, to deduce or predict how a group-member would behave when accessing the service through a different type of device. The
(Continued)

system identifies user-specific traits that are platform-independent and thus can be further monitored when the user switches from a first platform to a second platform.

8 Claims, 2 Drawing Sheets

Related U.S. Application Data which is a continuation of application No. 13/922,271, filed on Jun. 20, 2013, now Pat. No. 8,938,787, which is a continuation-in-part of application No. 13/877,676, filed as application No. PCT/IL2011/000907 on Nov. 29, 2011, now Pat. No. 9,069,942, application No. 14/675,770, which is a continuation-in-part of application No. 14/320,653, filed on Jul. 1, 2014, now Pat. No. 9,275,337, and a continuation-in-part of application No. 14/320,656, filed on Jul. 1, 2014, now Pat. No. 9,665,703, and a continuation-in-part of application No. 14/325,393, filed on Jul. 8, 2014, now Pat. No. 9,531,733, and a continuation-in-part of application No. 14/325,394, filed on Jul. 8, 2014, now Pat. No. 8,547,766, and a continuation-in-part of application No. 14/325,395, filed on Jul. 8, 2014, now Pat. No. 9,621,567, and a continuation-in-part of application No. 14/325,396, filed on Jul. 8, 2014, and a continuation-in-part of application No. 14/325,397, filed on Jul. 8, 2014, now Pat. No. 9,450,971, and a continuation-in-part of application No. 14/325,398, filed on Jul. 8, 2014, now Pat. No. 9,477,826.

(60) Provisional application No. 61/417,479, filed on Nov. 29, 2010, provisional application No. 61/843,915, filed on Jul. 9, 2013.

(51) Int. Cl.
*G06F 3/041* (2006.01)
*G06F 21/55* (2013.01)
*G06F 21/31* (2013.01)
*G06F 21/32* (2013.01)
*G06F 17/21* (2006.01)

(52) U.S. Cl.
CPC .......... *G06F 21/32* (2013.01); *H04L 63/0861* (2013.01); *H04L 63/102* (2013.01); *H04L 63/1408* (2013.01); *G06F 2221/034* (2013.01); *G06F 2221/2133* (2013.01)

(58) Field of Classification Search
CPC ....... G06F 2221/2133; G06F 2221/034; H04L 63/102; H04L 63/1408; H04L 63/0861
See application file for complete search history.

US 9,703,953 B2

METHOD, DEVICE, AND SYSTEM OF DIFFERENTIATING AMONG USERS BASED ON USER CLASSIFICATION

CROSS-REFERENCE TO RELATED APPLICATIONS

This application claims priority and benefit from U.S. provisional patent application No. 61/973,855, titled "Method, Device, and System of Detecting Identity of a User of an Electronic Service", filed on Apr. 2, 2014, which is hereby incorporated by reference in its entirety.

This application is a Continuation-in-Part (CIP) of, and claims priority and benefit from, U.S. patent application Ser. No. 14/566,723, filed on Dec. 11, 2014; which is a Continuation of U.S. patent application Ser. No. 13/922,271, filed on Jun. 20, 2013, now U.S. Pat. No. 8,938,787; which is a Continuation-in-Part (CIP) of U.S. patent application Ser. No. 13/877,676, filed on Apr. 4, 2013; which is a National Stage of PCT International Application number PCT/IL2011/000907, having an International Filing Date of Nov. 29, 2011; which claims priority and benefit from U.S. provisional patent application No. 61/417,479, filed on Nov. 29, 2010; all of which are hereby incorporated by reference in their entirety.

This application is a Continuation-in-Part (CIP) of, and claims priority and benefit from, U.S. patent application Ser. No. 14/320,653, filed on Jul. 1, 2014; which claims priority and benefit from U.S. provisional patent application No. 61/843,915, filed on Jul. 9, 2013; all of which are hereby incorporated by reference in their entirety.

This application is a Continuation-in-Part (CIP) of, and claims priority and benefit from, U.S. patent application Ser. No. 14/320,656, filed on Jul. 1, 2014; which claims priority and benefit from U.S. provisional patent application No. 61/843,915, filed on Jul. 9, 2013; all of which are hereby incorporated by reference in their entirety.

This application is a Continuation-in-Part (CIP) of, and claims priority and benefit from, U.S. patent application Ser. No. 14/325,393, filed on Jul. 8, 2014; which claims priority and benefit from U.S. provisional patent application No. 61/843,915, filed on Jul. 9, 2013; all of which are hereby incorporated by reference in their entirety.

This application is a Continuation-in-Part (CIP) of, and claims priority and benefit from, U.S. patent application Ser. No. 14/325,394, filed on Jul. 8, 2014; which claims priority and benefit from U.S. provisional patent application No. 61/843,915, filed on Jul. 9, 2013; all of which are hereby incorporated by reference in their entirety.

This application is a Continuation-in-Part (CIP) of, and claims priority and benefit from, U.S. patent application Ser. No. 14/325,395, filed on Jul. 8, 2014; which claims priority and benefit from U.S. provisional patent application No. 61/843,915, filed on Jul. 9, 2013; all of which are hereby incorporated by reference in their entirety.

This application is a Continuation-in-Part (CIP) of, and claims priority and benefit from, U.S. patent application Ser. No. 14/325,396, filed on Jul. 8, 2014; which claims priority and benefit from U.S. provisional patent application No. 61/843,915, filed on Jul. 9, 2013; all of which are hereby incorporated by reference in their entirety.

This application is a Continuation-in-Part (CIP) of, and claims priority and benefit from, U.S. patent application Ser. No. 14/325,397, filed on Jul. 8, 2014; which claims priority and benefit from U.S. provisional patent application No. 61/843,915, filed on Jul. 9, 2013; all of which are hereby incorporated by reference in their entirety.

This application is a Continuation-in-Part (CIP) of, and claims priority and benefit from, U.S. patent application Ser. No. 14/325,398, filed on Jul. 8, 2014; which claims priority and benefit from U.S. provisional patent application No. 61/843,915, filed on Jul. 9, 2013; all of which are hereby incorporated by reference in their entirety.

FIELD

The present invention is related to the security of electronic devices and systems.

BACKGROUND

Millions of people utilize mobile and non-mobile electronic devices, such as smartphones, tablets, laptop computers and desktop computers, in order to perform various activities. Such activities may include, for example, browsing the Internet, sending and receiving electronic mail (email) messages, taking photographs and videos, engaging in a video conference or a chat session, playing games, or the like.

Some activities may be privileged, or may require authentication of the user in order to ensure that only an authorized user engages in the activity. For example, a user may be required to enter a username and a password in order to access an email account, or in order to access an online banking interface or website.

SUMMARY

The present invention may include, for example, systems, devices, and methods for detecting identity of a user of an electronic device; for determining whether or not an electronic device is being used by a fraudulent user or by a legitimate user; and/or for differentiating among users of a computerized service or among users of an electronic device.

Some embodiments of the present invention may comprise devices, systems, and methods of detecting user identity, differentiating between users of a computerized service, and detecting a possible attacker.

The present invention may provide other and/or additional benefits or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements or components. The figures are listed below.

DETAILED DESCRIPTION OF THE PRESENT INVENTION

Figure 1:
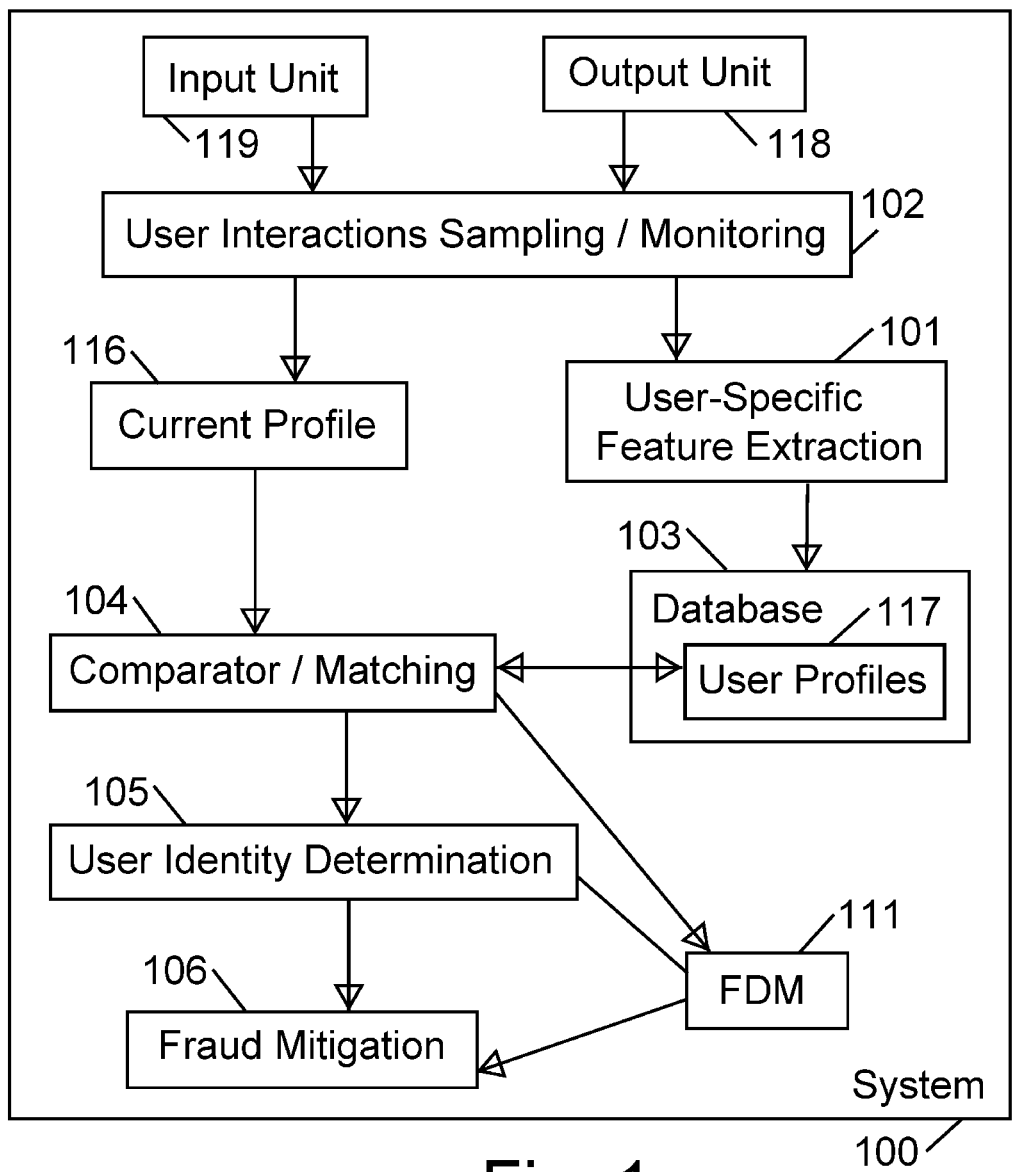
FIG. 1 is a schematic block-diagram illustration of a system, in accordance with some demonstrative embodiments of the present invention.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Applicants have realized that there exists a problem in identifying or authenticating a legitimate user who attempts to access a computerized service via a new device. For example, the user may access a banking website many times through a laptop computer; and then may attempt to access the same banking website for the first time from a smart-phone or a tablet. Some conventional systems may blindly regard this as a possible fraud attempt, and may blindly trigger fraud-mitigation steps in such situations (e.g., may require two-factor authentication). Applicants have realized that a more fine-tuned approach may be utilized and implemented, in order to reduce "false positive" fraud errors. For example, some user-specific traits may be identified by the system when the user utilizes a first type of device. A user-specific trait that is determined to be platform-independent, may be expected to be reflected also in a first-ever access of that user through a different platform or a new device; and may contribute to verifying user identity when the user accesses the same service via a new device.

Applicants have further realized that some users may be paired into pairs, or may be grouped into small groups or large groups, based on a behavioral or cognitive trait that is exhibited by such users when they respond to an input/output anomaly or similar type of injected interference or User Interface (UI) irregularity. The system may then follow the group-members as they switch from a first platform (e.g., laptop) to a second platform (e.g., smartphone, or tablet); and may detect which trait(s) the group-members typically have when using the second platform; thereby enabling the system to predict how a group-member would behave, in response to an injected interference, when utilizing the second platform for the first time.

For example, three users A and B and C may be grouped together based on their particular user-response type when they utilize a laptop to access a banking website. Users A and B may then utilize a smartphone to access the banking website, and the system may identify a common trait of users A and B when they interact with the banking website via smartphone. The system may then predict or estimate, that user C, who has never accessed the banking website via smartphone, would exhibit the same (or similar) trait(s), to those identified for users A and B, when utilizing a smartphone. Such estimation or prediction may be utilized for fraud-prevention purposes, and for reduction of "false positive" fraud-detection errors.

Reference is made to FIG. 1, which is a schematic block-diagram illustration of a system 100 in accordance with some demonstrative embodiments of the present invention. System 100 may comprise, for example, an input unit 119, an output unit 118, a user interactions sampling/monitoring module 102, a user-specific feature extraction module 101, a database 103 to store user profiles 117, an ad-hoc or current user profile 116, a comparator/matching module 104, a user identity determination module 105, a Fraud Detection Module (FDM) 111, and a fraud mitigation module 106.

System 100 may monitor interactions of a user with a computerized service, for example, user interactions performed via an input unit 119 (e.g., mouse, keyboard, stylus, touch-screen) and an output unit 118 (e.g., monitor, screen, touch-screen) that the user utilizes for such interactions at the user's computing device (e.g., smartphone, tablet, laptop computer, desktop computer, or other electronic device). For example, a user interactions monitoring/sampling module 102 may monitor all user interactions via the input unit 119 and/or the output unit 118; and may record, log, track, capture, or otherwise sample such user interactions; and/or may otherwise collect user interaction data.

In a demonstrative implementation, for example, an end-user may utilize a computing device or an electronic device in order to launch a Web browser and browse to a website or web-based application of a computerized service (e.g., a banking website, a brokerage website, an online merchant, an electronic commerce website). The web-server of the computerized service may serve code, for example HTML code, that the Web browser of the end-user device may parse and may display and/or execute. In accordance with the present invention, for example, a JavaScript code or code-portion may be served to the Web-browser of the end-user device; or may otherwise be "called from" or loaded from an HTML page that is served to the end-user device. The JavaScript code may operate as a "silent key-logger" module, and may monitor an track and log all the user interactions via keyboard, mouse, touch-screen, and/or other input units, as well as their timing; and may write or upload or send such information to the web-server or to a third-party server in which the user interactions monitoring/sampling module 102 may reside. In some embodiments, such "silent key-logger" may be implemented such that it logs or records or stores or uploads to the server, or analyzes, only anonymous data, or only data that excludes the actual content of user interactions, or only data that on its own does not enable identification of the user or of the content that the use types; e.g., by logging or storing only the data-entry rate or timing, or the key-presses rate or timing, and while not storing (or while discarding) the actual key-presses or content types; for example, logging and storing that the user typed eight characters in two seconds, rather than logging and typing that the user types the word "Jonathan" in two seconds. The data describing the user interactions may be sent or uploaded, for example, every pre-defined time interval (e.g., every second, or every 3 or 5 or 10 seconds), or once a buffer of interactions is filled (e.g., once 20 keystrokes are logged; once 6 mouse-clicks are logged). Other suitable methods may be used to monitor and log user interactions.

The user interaction data may enable a user-specific feature extraction module 101 to extract or estimate or determine or calculate user-specific features that characterize the interaction and which are unique to the user (or, which are probably unique to the user). The user-specific feature extraction module 101 may store in a database 103 multiple user profiles 117, corresponding to various users of the computerized service. A user may have a single stored profile 117; or a user may have multiple stored profiles 117 that correspond to multiple usage sessions of that user (e.g., across multiple days; or across multiple usage sessions that begin with a log-in and end with a log-out or a time-out).

Once a user accesses (or attempts to access) the computerized service, and/or during the access of the user to the computerized service, the user interaction monitoring/sampling module 102 may monitor or sample the current user interactions; and the user-specific feature extraction module 101 may optionally create a current or ad-hoc user profile 116 that characterizes the user-specific features that are currently exhibited in the current session of user interactions.

A comparator/matching module 104 may compare or match, between: (i) values of user-specific features that are extracted in a current user session (or user interaction), and (ii) values of respective previously-captured or previouslyextracted user-specific features (of the current user, and/or of other users, and/or of pre-defined sets of values that correspond to known automated scripts or "bots"). In some implementations, the comparator/matching module 104 may compare between the current ad-hoc user profile 116, and one or more previously-stored user profiles 117 that are stored in the database 103.

If the comparator/matching module 104 determines that one or more features, or a set of features, that characterize the current interaction session of the current user, does not match those features as extracted in previous interaction session(s) of that user, then, a possible-fraud signal may be generated and may be sent or transmitted to other modules of the system 100 and/or to particular recipients.

Additionally or alternatively, the comparator/matching module 104 may compare the features characterizing the current session of the current user, to features characterizing known automatic fraudulent mechanisms, known as malware or "bot" mechanisms, or other pre-defined data, in order to determine that, possibly or certainly, the current user is actually a non-genuine user and/or is accessing the service via a fraudulent mechanism.

In some embodiments, the comparator/matching module 104 may comprise, or may operate in association with, a Fraud Detection Module (FDM) 111, which may comprise (or may be implemented as) one or more sub-modules, as described herein.

In some embodiments, the output of the comparator/matching module 104 may be taken into account in combination with other information that the fraud detection module 111 may determine to be relevant or pertinent, for example, security information, user information, meta-data, session data, risk factors, or other indicators (e.g., the IP address of the user; whether or not the user is attempting to perform a high-risk activity such as a wire transfer; whether or not the user is attempting to perform a new type of activity that this user did not perform in the past at all, or did not perform in the past 1 or 3 or 6 or 12 months or other time-period; or the like).

The combined factors and data may be taken into account by a user identity determination module 105, which may determine whether or not the current user is a fraudster or is possibly a fraudster. The user identity determination module 105 may trigger or activate a fraud mitigation module 106 able to perform one or more fraud mitigating steps based on that determination; for example, by requiring the current user to respond to a challenge, to answer security question(s), to contact customer service by phone, to perform a two-step authentication or two-factor authentication, or the like.

System 100 may be implemented by using suitable hardware components and/or software modules, which may be co-located or may be distributed over multiple locations or multiple devices. Components and/or modules of system 100 may interact or communicate over one or more wireless communication links, wired communication links, cellular communication, client/server architecture, peer-to-peer architecture, or the like.

Some embodiments of the present invention may generate and/or may utilize a generic interference or generic abnormality to the user interaction, and may utilize an analysis of the user's response to such generic interference in order to differentiate among users, or in order to differentiate between a legitimate (authorized) user and a cyber-attacker, or in order to otherwise determine fraud or possible-fraud or attempted-fraud towards the computerized service.

The present invention may differentiate among users, and/or may detect a cyber-attacker or fraudulent activity, by utilizing classification of user-specific biometric and/or behavioral features based on dependency upon hardware and/or software.

Some embodiments may include modules that are able to better authenticate users (or detect fraud, and reduce False Positive errors) by taking into account, for example, the manner of way in which a user holds and/or operates the electronic device utilized for inputting commands or interacting with the service (e.g., tablet, smartphone); features indicating mental state or fatigue or mental pressure of the user; and/or the type of hardware and/or software used. The system may detect the same user (e.g., legitimate user, and not attacker) has switched from using a first device to a second device (e.g., from laptop or desktop computer, to smartphone or tablet; or vice versa), or has installed and logged-in through a mobile application or "app" on a smartphone or tablet.

The system may identify biometric and/or behavioral characteristics of the user, and may classify them based on (or taking into account) their dependency on the hardware, the software, the way of holding or operating the device (e.g., with one hand, or with two hands), and/or the estimated mental state of the user. The system may take into account cognitive parameters, such as, response times and user adaptation; as well as physiological traits or parameters, such as, relation or correlation between right-movement and left-movement (e.g., affected by the size or proportions of right-side muscle or physiology versus left-side muscle or physiology), or the curvature of curved motions or non-linear motions on a touch-screen (e.g., affected by the length of arm muscle or hand muscle or fingers).

The system may identify particular conditions, at which an interaction with the user is taking place; and the various biometric features may be classified in view of such particular conditions. For example, cognitive features may not change when the hardware being utilized is changed; but cognitive features may change when the mental state of the user changes. Relative physiological features (e.g., right-side oriented versus left-side oriented) may not change when the hardware being utilized changes; but may change when the usage scenario changes (e.g., the user operates the device sitting, or lying down). The system may further fine-tune or re-define the biometric/physiological profile of the user, and/or may select a suitable profile for the user, by taking into account the particular conditions of the present interaction being observed.

In a demonstrative implementation, the system may perform the following steps: (a) Collecting and isolating numerous examples of a single human user working on various platforms, hardware, software, various ways of holding the electronic device, and various mental states; (b) Signal processing to extract and to determine user-specific behavioral features that are not platform-dependent; (c) Applying feature selection algorithms to tag features, that were identified across multiple hardware implementations, as belonging to the same type of platform (e.g., features identified across multiple laptops, and grouped as a laptop-utilization feature); (d) Applying feature selection algorithms to tag features, that were identified across different platforms (e.g., smartphone and tablet), as belonging to the same type of device (e.g., mobile touch-screen device); (e) Analysis of performance before and/or after filtering of hardware-dependent features; optionally such filtering may be selectively used, depending on the functional goal of the system (e.g., to detect fraud, or to authenticate a legitimate user). Some implementations may utilize a hardware-independent biometric algorithm, which may reduce the number of False Positive errors when the legitimate user utilizes a new hardware setting; even though, in some implementations, such approach may reduce the probability of detecting an attacker since an attacker may not necessarily (or, may not typically) use the same hardware as the legitimate user.

Figure 2:
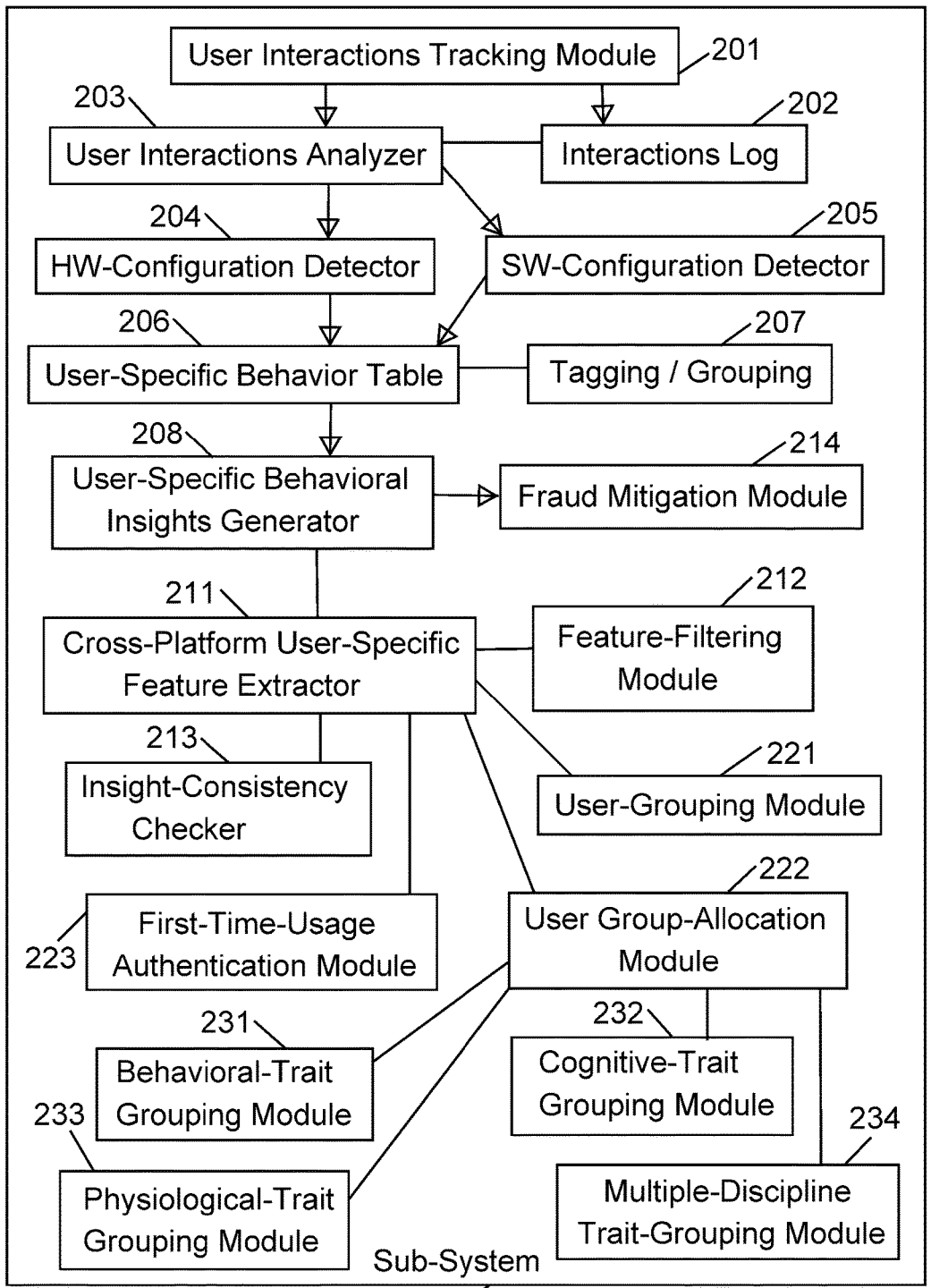
FIG. 2 is a schematic block-diagram illustration of a fraud detection sub-system, in accordance with some demonstrative embodiments of the present invention.

Reference is made to FIG. 2, which is a schematic block-diagram illustration of a fraud detection sub-system 200 in accordance with some demonstrative embodiments of the present invention. Sub-system 200 may operate to detect or to estimate, for example: fraud, fraud attempts, fraudulent computerized operations, unauthorized computerized operations, computerized operations that breach or violate a law or a regulation or policy or terms-of-use or an intended use of a service or website or application, or fraudulent activity.

Sub-system 200 may further operate to distinguish or differentiate among users (or to detect fraud) based on classification of features and their dependency on particular hardware and/or software being used by the end-user. Sub-system 200 may be implemented as part of, or as a sub-module of, the fraud detection module 111 of FIG. 1, the system 100 of FIG. 1, and/or other suitable systems or modules.

Sub-system 200 may comprise a user interaction tracking module 201, which may track the user interactions (e.g., keyboard presses, mouse-clicks, mouse-movements, touch-screen taps, and/or other user gestures) when the user interacts with a computerized service via an electronic device (e.g., desktop computer, laptop computer, tablet, smartphone, or the like). The user interaction tracking module 201 may observe and/or record and/or log all such user interactions, and may optionally store them in an interactions log 202 or other database or repository.

A user interactions analyzer 203 may review the tracked user interaction, in real time, or substantially in real time (e.g., within one second or within three seconds of the occurrence or completion of an interaction), or at pre-defined time intervals (e.g., every ten seconds, every 60 seconds), or at pre-defined triggering events (e.g., upon clicking of a "submit" button or a "confirm" button of an online form), or in retrospect (e.g., once a day in retrospect for all the daily interactions that reflect transactions that are in a pipeline for review prior to execution; or as part of a post-action audit process or crime investigation process). The user interactions analyzer 203 may look for a particular user interaction, or for a set or sequence or group or batch of consecutive user interactions, or for a set or sequence or group or batch of non-consecutive user interactions, that are pre-defined in the system as indicative of possible fraud activity (or alternatively, as pre-defined in the system as indicative of legitimate non-fraudulent activity).

A hardware-configuration detector 204 may determine and may record the particular hardware configuration that is being used by the user in order to access the computerized service. For example, the hardware-configuration detector 204 may utilize data and/or meta-data obtained from the end-user device, from the Web browser running on the end-user device and/or from other sources (e.g., by inspecting HTTP header(s), User-Agent or other strings in HTTP headers, TCI/IP stack fingerprints, a computer-defined "computer name" associated with the end-user device, screen resolution, window resolution, or the like).

A software-configuration detector 205 may determine and may record the particular software configuration that is being used by the user in order to access the computerized service; for example, indicating whether the user is accessing the computerized service via: (A) a Web browser that accesses the desktop-version website of the computerized service, or (B) a Web browser that accesses the mobile-version (mobile-friendly version) of the website of the computerized service, which is better or more suitably adapted for display on mobile electronic devices such as smartphones and tablets, or (C) a native application ("App") of the computerizes service which typically runs on a mobile electronic device and is typically offered for download and from local installation by accessing an "Applications Store". The software-configuration detector 205 may further detect which Operating System(s) are used, which Web browser type and/or version, whether or not JavaScript or Flash or Cookies are enabled or disabled, and/or other software-related configuration data.

The user interactions analyzer 203 may populate a user-specific behavior table 206, indicating how exactly the user interacts with particular features of the computerized service when certain hardware/software configurations are being utilized. In a demonstrative example, the user-specific behavior table 206 may have a structure or format which may be similar to Table 1:

TABLE 1

| Date/Time | Type of Device Used | Type of Software Used | Module that was Accessed | How the user "submitted" the log-in form |
|---|---|---|---|---|
| Feb. 18, 2014 08:43 | Desktop PC | Firefox 36 | Desktop-friendly website | Pressed the Enter key |
| Feb. 19, 2014 09:11 | Desktop PC | Chrome 32 | Desktop-friendly website | Pressed the Enter key |
| Feb. 19, 2014 22:48 | iPhone | Native App | Native App | Tapped on "submit" button |
| Feb. 20, 2014 23:08 | iPhone | Safari Browser | Mobile-friendly website | Tapped on "submit" button |
| Feb. 21, 2014 09:27 | Desktop PC | Firefox 36 | Desktop-friendly website | Pressed the Enter key |

The user-specific behavior table 206 may be examined and analyzed by a tagging/grouping module 207 (or classifying module, or classifier), which may tag or may group together (or may classify together) user-interactions based on similar or common characteristics thereof; and such tagging or grouping may allow a user-specific behavioral insights generator 208 to generate one or more insights or conclusions with regard to patterns of usage that are exhibited or reflected across multiple (consecutive, or non-consecutive) user interactions and/or user sessions For example, the user-specific insights generator 208 may generate the following insights or "rules" for a specific user named Adam: (A) an insight that when Adam uses a desktop computer, he always (or, at high probability) utilizes Firefox browser to access the service, rather than other browsers; (B) an insight that when Adam uses a desktop computer, he always (or, at high probability) utilizes a browser to access the desktop-friendly version of the service, rather than the mobile-friendly version of the computerized service; (C) an insight that when Adam uses a mobile device, he always (or, at high probability) utilizes the native application to access the service, rather than a Web browser; (D) an insight that when Adam uses a desktop computer, he always (or, at high probability) presses the Enter key to submit a log-in form (rather than clicking an on-screen Submit button with a mouse-pointer); (E) an insight that when Adam uses a mobile device, he always (or, at high probability) taps on the on-screen Submit button to submit the log-in form (rather than clicking the Enter key of an on-screen keyboard); (F) an insight that in the AM the user always (or typically) utilizes a desktop computer and/or a Web browser to access the computerized service; (G) an insight that in the PM the user always (or typically) utilizes a mobile device to access the computerizes service; and/or other suitable insights.

Cross-platform user-specific features extractor 211 may analyze the user interaction data in order to extract, identify and/or detect patterns or characteristics that characterize the behavior of the particular user across multiple hardware/software configurations that are of the same type, regardless of the particular machine or software that is used. For example, the cross-platform user-specific features extractor 211 may generate the following insights: (A) an insight that whenever the user Adam utilizes a mobile device to access the computerized service, regardless if the mobile device is a smartphone or a tablet, the user Adam always submits a log-in form by tapping on the on-screen Submit button and not by tapping on the on-screen Enter key of an on-screen keyboard; (B) an insight that whenever the user Adam utilizes a non-mobile computer (e.g., any desktop computer) to access the computerized service, the user Adam always clicks with the mouse-pointer on a Submit button (and does not press the Enter key on the keyboard for submitting the log-in form); and/or other insights. For example, the cross-platform user-specific features extractor 211 may generate insights or rules-of-behavior that characterize the behavior or the interactions of the user for the same type of platform; such as, features identified across multiple laptops and grouped together as laptop-utilization characteristics of that user, or, features identified across multiple mobile devices (or smartphones, or tablets, or both) and grouped together as mobile-utilization characteristics of that user.

Optionally, a feature-filtering module 212 may operate to filter-out or to remove or to discard, one or more deduced user-specific characteristics, from the list or the group of user-specific features that were extracted. Such filtering-out or removal or discarding may relate to, for example, features that are attributed to the limitations or the characteristics of the hardware/software configuration; for example, if there is no Native Application for desktop devices, then the fact that the specific user always uses a Web browser to access the computerized service is indeed correct but is not a meaningful insight for the purpose of differentiating among users and/or detecting a cyber-attacker. Filtering-out may be performed for other reasons, for example, based on the context of the detection being performed; e.g., whether the system is configured or oriented towards the purpose of confirming the identity of an authorized user, or (in contrast) the purpose of detecting and blocking a cyber-attacker or fraudulent activity.

An insight-consistency checker module 213 may continuously and/or periodically monitor the user interactions with the computerized service, in order to dynamically check whether or not a currently-performed (or a recently-performed) interaction that the user performed, matches (or is in accordance with; or does not violate) a previously-determined insight that was generated with regard to cross-platform user-specific activity. The user-consistency checker module 213 may trigger a fraud mitigation module 214, if a mismatch is determined, or if a deviation is detected from a cross-platform user-specific insight that was established for the current user based on previous interactions. The fraud mitigation module 214 may block the attempted transaction, or may require the current user to perform particular operations (e.g., to contact the fraud department by phone; to perform two-factor authentication or two-step authentication).

For example, the user-consistency checker module 213 may detect that even though the particular user Adam has always pressed the Enter key to submit a wire-transfer form when he used a non-mobile device, in a current usage session the user Adam has just clicked the on-screen Submit button with a mouse. The user-consistency checker module 213 identifies that the violated insight is a cross-platform insight that characterizes the user Adam across all non-mobile devices. The user-consistency checker module 213 identifies that the insight is not relevant to smartphones, and that the user Adam is currently not utilizing a mobile device. Accordingly, the user-consistency checker module 213 triggers or activates (or sends a signal to) the fraud mitigation module 214; or performs other suitable operations (e.g., increases a possible-fraud score or weighted-score, which may be periodically checked or compared against as fraud-indicating threshold value).

Some embodiments of the present invention may enable authenticating of first-time usage of a new device by a legitimate user, who had lawfully accessed the same computerized service via other hardware device(s).

Some embodiments may detect cross-channel fraud by identifying behavioral discrepancies between the channels; for example, by profiling the user behavior online, and then checking if his first-time mobile behavior matches the first-time mobile behavior of users with similar online behavior (via classification), and checking for physiological/behavioral/cognitive biometric discrepancies (e.g., the user appears to be left handed when using a laptop, but appears to be right handed when using a smartphone).

Applicants have realized that an attacker may bypass some conventional security systems by accessing an online account via a laptop; utilizing the laptop only for the purpose of authorizing access from a new mobile platform (tablet, smartphone) that the attacker controls; and then utilizing the attacker's mobile platform to access the online account and to perform (via the mobile platform) fraudulent activity.

The system of the present invention may detect such cross-channel fraud, by predicting or estimating how a particular user (or a set of users having a common characteristic) is expected to behave and interact, when switching from a current platform (e.g., laptop or desktop computer) to a different platform (e.g., mobile platform, smartphone, tablet), or vice versa. The system may attempt to classify the user into a control group of users, based on his interactions in a first platform; and then, predict or estimate how such user would behave or interact with the system when utilizing a second platform, based on the features learned from other members of that group of users; for example, learning from a group of users which features are maintained and which are modified when a user switches from a non-mobile platform to a mobile platform, or vice versa.

The system may utilize similar user profiles, in order to predict or estimate the behavior or interactions of a legitimate user when switching between platforms. For example, the system may determine that users A and B and C have similar or common behavioral/cognitive/physiological biometric features when using a laptop computer for accessing the same online service; the system may further determine that users A and B maintain a particular feature when accessing the same online service from a mobile platform; and thus, the system may predict that user C, if he is indeed the legitimate user C (and not a cyber-attacker), would probably have the same particular feature when he accesses the same online service from a mobile platform. If the feature exists when user C accesses the online service from a mobile platform, then it may indicate that user C is legitimate; otherwise, it may signal that a fraud may be taking place and that an attacker is attempting to utilize the online service using the credentials of user C.

The system may thus be able to generate an alert notification, that a user who is currently (or was recently) using the online service from a new platform (e.g., smartphone or tablet) is not the same, legitimate, user that had accessed the same online service from a previous platform (e.g., laptop or desktop computer).

Referring again to FIG. 2, sub-system 200 may further comprise a user-grouping module 221 (or user classifying module, or user classifier module) able to group together (or classify together) multiple users of the computerized service, based on common or similar or identical behavioral/physiological/cognitive/biometric traits. For example, the user-grouping module may group together a group of three persons, or a group of K users (for example, K being 80 or 750 users) who have the following characteristics: when each one of these K users accessed the computerized service via a non-mobile device (e.g., via a desktop computer), he used the Tab key to move between fields in a wire-transfer form, and he further utilized the Enter key to "submit" a wire-transfer form; and when each one of these same K users accessed the computerized service through a smartphone, he did not tap an on-screen Submit button or icon, but rather, he pressed "Enter" on an on-screen keyboard in order to submit a wire-transfer form via the smartphone.

A user group-allocation module 222 may then follow the interactions of a user Bob, who so far have accessed the computerized service only via a non-mobile device (e.g., via a desktop computer). The user group-allocation module 222 may identify that the user Bob, who so far accessed the computerized service only via a desktop computer, has always used the Tab key to navigate among fields of the wire-transfer form; and also, has always used the Enter key to "submit" the wire-transfer form; and therefore, the user group-allocation module 222 may determine that the user Bob is a good match for inclusion in the above-mentioned group, and therefore, when user Bob would access the computerized service from a smartphone or tablet (or mobile device) for the first time, then most probably the user Bob would press the "Enter" key on an on-screen keyboard (rather than tapping an on-screen Submit button) in order to submit the wire-transfer form via the mobile device.

Accordingly, when user Bob indeed accesses the computerized service from a mobile device for the first time (and not from a desktop computer as in all his prior usage sessions), then a first-time-usage authentication module 223 may examine the interactions of user Bob in that first-time usage through the mobile device, in order to determine whether or not they are indeed consistent with the characteristics of the other K uses in that above-mentioned group that user Bob is a member of. Therefore, when user Bob accesses the computerized service from a mobile device for the first time, if user Bob presses the "Enter" key for submitting the form (rather than tapping the on-screen Submit button), then the first-time-usage authentication module 223 determines that this is the expected behavior based on the inclusion of Bob in that group of users, and thus user Bob is probably a legitimate user who now uses a new device for the first time, rather than a cyber-attacker or imposter who utilizes a new device and poses as user Bob. In contrast, when user Bob accesses the computerized service from a mobile device for the first time, if user Bob taps the on-screen Submit button for submitting the form (rather than pressing the Enter key of the on-screen keyboard), then the first-time-usage authentication module 223 determines that this is not the expected behavior based on the inclusion of Bob in that group of users, and thus user Bob is probably not the legitimate user who now uses a new device for the first time, but rather, it is a cyber-attacker or imposter who utilizes a new device and poses as user Bob; and the fraud mitigation module 214 is triggered or activated.

In another demonstrative example, the user group-allocation module 222 may then follow the interactions of a user Charles, who so far have accessed the computerized service only via a non-mobile device (e.g., via a desktop computer). The user group-allocation module 222 may identify that the user Charles, who so far accessed the computerized service only via a desktop computer, has not used the Tab key to navigate among fields of the wire-transfer form (but rather, has used the mouse to navigate among fields of the form); and also, has always used the Enter key to "submit" the wire-transfer form; and therefore, the user group-allocation module 222 may determine that the user Charles is not a good match for inclusion in the above-mentioned group. Therefore, when user Charles would access the computerized service from a smartphone or tablet (or mobile device) for the first time, the first-time-usage authentication module 223 would not utilize any insights learned from the behavior of the above-mentioned group of K users; but rather, the first-time-usage authentication module 223 may utilize one or more other insights or predictions or predictive-rules that may be learned by the user group-allocation module 222 based on a different grouping of N users (which may be a separate group, or which members may partially overlap with the previous group of K users). For example, a second group of N users may be defined by the user group-allocation module 222, such that each member in that group exhibited on non-mobile computer the same behavioral user interaction traits that Charles exhibited as described above; and the behavior of those N users when they transition to a mobile device, as observed by the user group-allocation module 222, may be used by the first-time-usage authentication module 223 when predicting or determining whether the first-time usage of user Charles via a mobile device indeed exhibits such characteristics (and thus indicates that user Charles is genuine) or not (and thus indicates that user Charles is actually an imposter cyber-attacker).

In some embodiments, the grouping and/or tagging may be performed and later utilized, based on biometric traits, behavioral traits, identified cognitive traits, identified physical traits or physiological traits of the users, and/or a combination of such traits or such multiple types of traits. In some implementations, for example, the user group-allocation module 222 may be implemented as multiple grouping modules or sub-modules, for example: (A) a behavioral-trait grouping module 231 able to selectively group-together a set of users into a group based on a common identified behavioral trait (e.g., the trait that the user scrolls the screen vertically using a scroll-wheel of the mouse, rather by pressing the Arrow Keys on the keyboard); (B) a cognitive-trait grouping module 232 able to selectively group-together a set of users into a group based on a common identified cognitive trait (e.g., the trait that the user selects items from a drop-down menu using the mouse and not by using the keyboard); (C) a physiological trait grouping module 233 able to selectively group-together a set of users into a group based on a common identified cognitive trait (e.g., the trait that the user is right-handed based on analysis of curved motion of the thumb when the user scrolls or taps a smart-phone, such that the analysis indicates that the on-screen curve gesture matches a right-handed person that utilized his right-hand thumb); (D) a multiple-discipline trait grouping module 234 able to selectively group-together a set of users into a group based on a set of common identified trait that belong to different disciplines (e.g., the combined set of traits in which, the user utilizes his left-hand thumb for scrolling the screen of a smartphone (physiological trait) and also the user utilizes a drop-down mini-calendar matrix to choose a date rather than typing the date (behavioral trait), or other suitable combinations). Other suitable modules or parameters may be utilized, in order to group or classify users into such groups; in order to allocate users to groups; in order to re-group or modify classifications or inclusions or allocations; in order to determine that a particular user has changed his behavior pattern (or other traits) and should be excluded or removed from a particular group or class; or for other user-differentiation purposes or fraud-detection purposes.

In some embodiments, the system may firstly determine or estimate or recognize, which user-specific features or traits are cross-platform features or traits, and/or are transferrable from a first platform (e.g., a first device, or type of device) to a second platform (e.g., a second device, or type of device). For example, the system may identify a particular user-specific feature or trait, e.g., the response time that it takes a user to respond to an on-screen irregularity or anomaly (e.g., due to an injected input/output interference or aberration); this may be classified by the system as a cognitive trait, and the system may operate by estimating that such trait is generally platform-independent: for example, a user that has a long cognitive delay in observing and responding to an on-screen interference when utilizing a first device (e.g., a laptop computer), is expected to have a similar (e.g., long) delay in observing and responding to an on-screen interference when utilizing a second device (e.g., a desktop computer).

In contrast, the system may also determine and/or identify and/or recognize and/or estimate user-specific traits, that are determined to be (or are estimated to possibly be) platform-dependent, or at least partially platform-dependent. For example, a physiological-oriented user-specific trait, such as the time required to manually correct a mouse-pointer irregularity by using a mouse unit, may not necessarily be transferrable to a touch-screen mouse-less platform; and thus, the user's response to on-screen pointer irregularity, as corrected manually via a mouse unit by the user, may be tagged by the system as non-transferrable to other platforms; and may be tagged by the system as a user-specific trait that should not be utilized when subsequently performing user authentication or user-identity-confirmation when the user utilizes a different platform (e.g., mouse-less platform, touch-screen based platform).

Accordingly, the system may allocate different weight values, or relative weight values, to each identified user-specific trait; by taking into account whether the level of this trait being platform-dependent or platform-independent. Some user-specific traits may have a high weight value (e.g., value of 90 or 94 or 100, on a scale of 0 to 100), if they are traits that are estimated to transfer with the user from a first device to a second device, or from a first platform to a second platform. Other user-specific traits may have a low weight value (e.g., 0 or 2 or 5, on a scale of 0 to 100), if they are traits that are estimated to not-transfer with the user from device to device, or from platform to platform. Still other user-specific traits may have other weight values (e.g., 30 or 55 or 70, on a scale of 0 to 100), if they are traits that are estimated to be somewhat-transferable (or, not-necessarily transferrable) with the user from device to device, or from platform to platform.

The system may thus allocate or assign different weight values to different user-specific features; and a weighted risk-level calculator (or a weighted fraud-score calculator) may calculate a weighted risk-level or fraud-score value, in subsequent interactions or sessions, taking into account such allocated weights or relative weight values.

The system may further correlate certain user-specific traits, with a certain mental state and/or mood state and/or physiological state of the user, thereby increasing or decreasing the relative weight that such feature(s) would receive later, based on the subsequent mental state or mood state or physiological state of the user.

In a first example, the system may identify that user Adam exhibits a slow response time to on-screen interferences, and takes a long time (e.g., five seconds) to manually correct an on-screen mouse-pointer irregularity (e.g., a long time, relative to the general population of users, or relative to the population of users of a particular service or website or type-of-transaction, or relative to a pre-defined threshold value). However, the system may also observe that the slow-response of user Adam was identified and recorded when the local time for Adam was 3:45 AM (e.g., based on his home address on the account, or based on geo-location of Adam's location via IP address and then finding the local time there). Based on pre-defined rules, the system may automatically tag that user-specific trait (of "Adam responding slowly to on-screen mouse-pointer interference") with a tag that indicates that the trait was extracted or identified at a time in which most users are either asleep or tired, and thus possibly user Adam was tired at that time. Therefore, the system may allocate or may assign a low weight (e.g., a value of 2 or 7, on a scale of 0 to 100) to that user-specific trait that was observed at 3:45 AM; such that subsequent reliance by the system on that user-specific trait, during regular business hours (e.g., from 9 AM to 5 PM) or during regular awake hours (e.g., from 7 AM to 11 PM), would allocate a much-reduced weight or a minimal weight, or even zero weight, to that user-specific trait that was deduced based on user interactions at a time that user fatigue was estimated.

It is noted that in some implementations, the system may further differentiate between: (A) a user-specific trait that is expected to reflect fatigue when performed at 3:45 AM, and thus would be assigned reduced-weight for utilization during other times of the day; and (B) a user-specific trait that was also identified at 3:45 AM, but is estimated to not be affected from fatigue, and thus may still be assigned a higher-weight for utilization during other times of the day.

In a second example, the system may allocate a weight to a user-specific trait, based on one or more physiological parameters of the user that were identified at the time of extracting the trait. For example, a user may lay down on a bed or a sofa, and may hold his smartphone upside-down (e.g., the screen facing towards the ground, towards the user who lies down on his back), or may hold the smartphone upside-down at a low angle (e.g., 5 or 10 or 15 degrees) relative to the ground. This may be identified by the system by utilizing readings or measurements from one or more sensors of the smartphone (e.g., gyroscopes, accelerometers, GPS, wireless transceivers, cellular transceivers, or the like). The system may thus tag or classify, a particular user-specific trait that was extracted at that time, as a trait that was extracted when the user was lying down on his back. The system may then allocate a different weight to this user-specific trait, based on the system's estimation of whether or not this user-specific trait is expected to be transferrable to (or, to be exhibited in) usage sessions in which the user is not lying down, for example, the user stands or sits.

For example, the user's cognitive features (e.g., slow or fast response time to on-screen irregularities) are estimated to be platform-independent or position-independent, and may be tagged as transferrable to any user positions (e.g., lying, sitting, standing); and may thus be assigned a higher weight for authentication purposes or for identity confirmation purposes. In contrast, a user-specific trait that is physiology-based (e.g., the size or length of an on-screen curve that the user performs with his thumb in order to scroll-down a screen), may be tagged by the system as a user-specific trait that is highly-dependent on user's position; and thus, if that trait was extracted when the user was estimated to by lying down on his back, a suitable (e.g., low) weight value may be assigned to that trait, indicating that this trait should be given a low weight when subsequently examining the user's interactions when the user is in non-lying position (e.g., sitting, standing, walking).

Some embodiments of the present invention may classify users into pairs, triplets, quadruplets, or other groups or classes or batches of multiple users, based on similar user-specific traits that were identified for all the members of such created class or group. For example, ten users may be classified together into Group A, based on similar user-specific traits that they exhibited when they interacted with a banking website through a laptop computer. Then, the system may observe that eight out of those ten group-members, exhibited a particular trait when they interacted with the same banking website but through a tablet. The system may thus predict by extrapolation, that the tenth member (or, the ninth member and the tenth member) of that Group A, who has never interacted with that banking website through a tablet, would most probably exhibit the same user-specific trait that was already identified for those other eight group-members of Group A. The system may thus utilize this prediction or extrapolation, in order to authenticate or confirm the identity of a user, who poses to be the tenth user of Group A, in his first-ever access to the banking website through the new device or the new tablet (e.g., tablet); thereby enabling the system to reduce the automatic generation of "false positive" fraud-alerts.

The present invention may differentiate or distinguish between the genuine (human) user, and a robot or a machine-operable module or function (e.g., implemented as a computer virus, a Trojan module, a cyber-weapon, or other malware) which attempts to automatically imitate or emulate or simulate movement of a cursor or other interaction with a touch-screen. For example, false identity created by automated malware may be detected by the present invention as such automated malware may lack the characterization of human (e.g., the manual activity having the particular user-specific traits, as described above).

The present invention may operate and may provide an efficient biometric or user-authentication modality, without capturing, storing, or otherwise identifying any Personally Identifiable Information (PII). For example, the present invention may be used to distinguish between a genuine user and a fraudster, without knowing any PPI of the genuine user and/or of the fraudster.

The present invention may detect correlations and extract user-specific traits based on passive data collection and/or based on active challenges. In passive data collection, the device may detect that the user is performing a particular operation (e.g., a vertical scroll gesture), and may further detect that performing this gesture affects in a user-specific way the acceleration and/or the orientation/rotation of the mobile device. In an active challenge, the device (or an application or process thereof) may actively present a challenge to the user, such as, a requirement to the user to perform horizontal scrolling, in order to capture data and detect user-specific correlation(s). The active challenge may be hidden or may be unknown to the user, for example, implemented by creating a Graphical User Interface (GUI) that requires the button to scroll in order to reach a "submit" button or a "next" button or a "continue" button, thereby "forcing" the user to unknowingly perform a particular user-gesture which may be useful for correlation detection or for extraction of user-specific traits, as described. Alternatively, the active challenge may be known to the user, and may be presented to the user as an additional security feature; for example, by requesting the user to drag and drop an on-screen object from a first point to a second point, as an action that may be taken into account for confirming user identity.

Some embodiments of the present invention may be implemented, for example, as a built-in or integrated security feature which may be a component or a module of a system or device, or may be a downloadable or install-able application or module, or plug-in or extension; or as a module of a web-site or web-page, or of a client-server system or a "cloud computing" system; or as machine-readable medium or article or memory unit able to store instructions and/or code which, when executed by the mobile device or by other suitable machine (e.g., a remote server, or a processor or a computer) cause such machine to perform the method(s) and/or operations described herein. Some units, components or modules, may be implemented externally to the user device, may be implemented in a remote server, a web server, a website or webpage, a "cloud computing" server or database, a client/server system, a distributed system, a peer-to-peer network or system, or the like.

The present invention may be used in conjunction with various suitable devices and systems, for example, various devices that have a touch-screen; an ATM; a kiosk machine or vending machine that has a touch-screen; a touch-keyboard; a system that utilizes Augmented Reality (AR) components or AR glasses (e.g., Google Glass); a device or system that may detect hovering gestures that do not necessarily touch on the screen or touch-screen; a hovering screen; a system or device that utilize brainwave analysis or brainwave control in which the user's brainwaves are captured or read and the user's brain may directly control an application on the mobile device; and/or other suitable devices or systems.

In accordance with some embodiments of the present invention, for example, a method may comprise: determining whether a user, who utilizes a computing device to interact with a computerized service, is either an authorized user or an attacker; wherein the determining comprises: monitoring user interactions of said user during multiple usage sessions; identifying a first cross-platform user-specific trait that characterizes usage sessions in which said user interacted with the computerized service via a first type of computing device; identifying a second cross-platform user-specific trait that characterizes usage sessions in which said user interacted with the computerized service via a second type of computing device; in a subsequent usage session that is assumed to belong to said user, checking whether user interactions during said subsequent usage session match only one of said first or second cross-platform user-specific traits, based on a type of computing device that is actually utilized by said user in said subsequent usage to access the computerized service.

In some embodiments, the checking comprises: if it is determined that said user is utilizing in said subsequent session, a computing device that belongs to said first type of computing device, then: determining whether user interactions of said user during the subsequent usage session of said user, match the first cross-platform user-specific trait.

In some embodiments, the checking comprises: if it is determined that said user is utilizing in said subsequent session, a computing device that belongs to said first type of computing device, then: comparing user interactions of said user during said subsequent usage session, against a group of user-specific traits that includes the first cross-platform user-specific trait and that excludes the second cross-platform user-specific trait.

In some embodiments, the method may comprise: identifying the first cross-platform user-specific trait as a first trait which characterizes usage sessions in which said user interacted with the computerized service via any portable computing device selected from the group consisting of smartphone and tablet; identifying the second cross-platform user-specific trait as a second trait which characterizes usage sessions in which said user interacted with the computerized service via any non-portable computing device; in a subsequent usage session that is assumed to belong to said user, checking whether user interactions during said subsequent usage session match only one of said first or second traits, based on a determination of whether said user utilizes either a portable or a non-portable computing device to access the computerized service during the subsequent usage session.

In some embodiments, the method may comprise: identifying the first cross-platform user-specific trait as a first trait which characterizes usage sessions in which said user interacted with the computerized service via any non-portable computing device selected from the group consisting of laptop computer and desktop computer; identifying the second cross-platform user-specific trait as a second trait which characterizes usage sessions in which said user interacted with the computerized service via any portable computing device; in a subsequent usage session that is assumed to belong to said user, checking whether user interactions during said subsequent usage session match only one of said first or second traits, based on a determination of whether said user utilizes either a portable or a non-portable computing device to access the computerized service during the subsequent usage session.

In some embodiments, the method may comprise: identifying the first cross-platform user-specific trait as a first trait which characterizes usage sessions in which said user interacted with the computerized service via any computing device having a touch-screen; identifying the second cross-platform user-specific trait as a second trait which characterizes usage sessions in which said user interacted with the computerized service via any computing device having a non-touch screen; in a subsequent usage session that is assumed to belong to said user, checking whether user interactions during said subsequent usage session match only one of said first or second traits, based on a determination of whether said user utilizes either a touch-screen computing device or a non-touch-screen computing device to access the computerized service during the subsequent usage session.

In some embodiments, the method may comprise: identifying the first cross-platform user-specific trait as a first trait which characterizes usage sessions in which said user interacted with the computerized service via any computing device through any Web browser; identifying the second cross-platform user-specific trait as a second trait which characterizes usage sessions in which said user interacted with the computerized service via any computing device through a non-browser native application of said computerized service; in a subsequent usage session that is assumed to belong to said user, checking whether user interactions during said subsequent usage session match only one of said first or second traits, based on a determination of whether said user utilizes either a Web browser or a native application to access the computerized service during the subsequent usage session.

In some embodiments, the method may comprise: identifying a first cross-platform user-specific trait that characterizes usage sessions in which said user interacted with the computerized service via a first type of software application; identifying a second cross-platform user-specific trait that characterizes usage sessions in which said user interacted with the computerized service via a second type of software application; in a subsequent usage session that is assumed to belong to said user, checking whether user interactions during said subsequent usage session match only one of said first or second cross-platform user-specific traits, based on a type of software application that is actually utilized by said user in said subsequent usage to access the computerized service.

In some embodiments, the method may comprise: identifying the first cross-platform user-specific trait as a first trait which characterizes usage sessions in which said user interacted with the computerized service via any computing device through any Web browser; identifying the second cross-platform user-specific trait as a second trait which characterizes usage sessions in which said user interacted with the computerized service via any computing device through a non-browser native application of said computerized service; in a subsequent usage session that is assumed to belong to said user, checking whether user interactions during said subsequent usage session match only one of said first or second traits, based on a determination of whether said user utilizes either a Web browser or a native application to access the computerized service during the subsequent usage session.

In some embodiments, the method may comprise: identifying the first cross-platform user-specific trait as a first trait which characterizes usage sessions in which said user interacted with the computerized service via both (A1) a first type of hardware configuration, and (B1) a first type of software configuration; identifying the second cross-platform user-specific trait as a second trait which characterizes usage sessions in which said user interacted with the computerized service via both (A2) a second type of hardware configuration, and (B2) a second type of software configuration; in a subsequent usage session that is assumed to belong to said user, checking whether user interactions during said subsequent usage session match only one of said first or second traits, based on a determination of whether said user utilizes either: (x) the first type of hardware configuration and also the first type of software configuration, or (y) the second type of hardware configuration and also the second type of software configuration.

In some embodiments, the method may comprise: identifying the first cross-platform user-specific trait as a first trait which characterizes usage sessions in which said user interacted with the computerized service via both (A1) any non-portable computing device, and (B1) any Web browser;

identifying the second cross-platform user-specific trait as a second trait which characterizes usage sessions in which said user interacted with the computerized service via both (A2) any portable computing device, and (B2) a non-browser native application of said computerized service; in a subsequent usage session that is assumed to belong to said user, checking whether user interactions during said subsequent usage session match only one of said first or second traits, based on a determination of whether said user utilizes either: (x) a non-portable computing device and also a Web browser, or (y) a portable computing device and also a non-browser native application of said computerized service.

In some embodiments, the method may comprise: identifying the first cross-platform user-specific trait as a first trait which characterizes usage sessions in which said user interacted with the computerized service via both (A1) any non-portable computing device, and (B1) any Web browser; identifying the second cross-platform user-specific trait as a second trait which characterizes usage sessions in which said user interacted with the computerized service via both (A2) any portable computing device, and (B2) any Web browser; in a subsequent usage session that is assumed to belong to said user, checking whether user interactions during said subsequent usage session match only one of said first or second traits, based on a determination of whether said user utilizes either: (x) a non-portable computing device and also any Web browser, or (y) a portable computing device and also any Web browser; wherein said checking excludes checking of user interactions against the first trait and further excludes checking of user interactions against the second traits if it is determined that said user utilizes both a non-portable computing device and a non-browser native application to access the computerized service during said subsequent session.

In some embodiments, the method may comprise: identifying user-specific behavioral characteristics of said user based on analysis of user interactions; classifying said user-specific behavioral characteristics based on their dependency on the a combination of hardware configuration and software configuration that said user utilizes to access the computerized service.

In some embodiments, the method may comprise: identifying user-specific cognitive characteristics of said user based on analysis of user interactions that indicate a cognitive trait of user-specific typical response time; classifying said user-specific cognitive characteristics based on their dependency on the a combination of hardware configuration and software configuration that said user utilizes to access the computerized service.

In some embodiments, the method may comprise: identifying user-specific cognitive characteristics of said user based on analysis of user interactions that indicate a cognitive trait of user-specific typical adaptation time to input/output anomalies; classifying said user-specific cognitive characteristics based on their dependency on the a combination of hardware configuration and software configuration that said user utilizes to access the computerized service.

In some embodiments, the method may comprise: identifying user-specific physiological characteristics of said user based on analysis of user interactions that indicate a physiological trait of the user that corresponds to whether said use utilizes right-hand or left-hand to operate the computing device when accessing the computerized service; classifying said user-specific physiological characteristics based on their dependency on the a combination of hardware configuration and software configuration that said user utilizes to access the computerized service.

In some embodiments, the method may comprise: identifying user-specific physiological characteristics of said user based on analysis of user interactions that indicate a physiological trait of the user that corresponds to curvature of an on-screen gesture that said user performs to operate the computing device when accessing the computerized service; classifying said user-specific physiological characteristics based on their dependency on the a combination of hardware configuration and software configuration that said user utilizes to access the computerized service.

In some embodiments, the method may comprise: applying a signal processing algorithm to extract from user interactions user-specific behavioral features that are not platform-dependent; applying a feature selection algorithm to classify user-specific behavioral features, that are identified across multiple hardware configurations associated with said user, as belonging to a particular same type of computing platforms as a differentiator among users if it is determined that said user utilizes, in a subsequent usage session, a platform of said particular same type of computing platforms.

In some embodiments, the method may comprise: applying a signal processing algorithm to extract from user interactions user-specific behavioral features that are not platform-dependent; applying a feature selection algorithm to classify in a same group multiple user-specific behavioral features, which belong to a particular same type of computing platforms, if said multiple user-specific behavioral features are identified across multiple hardware configurations associated with said user; applying a user differentiation algorithm that is based on multiple user-specific behavioral features that belong to said same group and that exclude other user-specific behavioral features that are platform-dependent.

In some embodiments, the method may comprise: applying a signal processing algorithm to extract from user interactions user-specific behavioral features that are not platform-dependent; applying a feature selection algorithm to classify in a same group multiple user-specific behavioral features, which were identified across both a tablet of said user and a smartphone of said user; if it is determined that said user accesses the computerized device, in a subsequent usage session, via either a tablet or a smartphone, then applying a user differentiation algorithm that is based on multiple user-specific behavioral features that belong to said same group and that exclude other user-specific behavioral features that are platform-dependent.

In accordance with some embodiments of the present invention, a method may comprise: determining whether a user, who utilizes a computing device to interact with a computerized service, is either an authorized user or an attacker; wherein the determining comprises: (i) monitoring user interactions of at least a first user and a second user and a third user during multiple usage sessions with the computerized service; (ii) determining that the user interactions of the first user, the user interactions of the second user, and the user interactions of the third user, all exhibit a same first behavioral trait when the first, the second and the third user are utilizing a first type of computing platform to access the computerized service; (iii) determining that the user interactions of the first user and the user interactions of the second user, exhibit a same second behavioral trait when the first and the second user are utilizing a second type of computing platform to access the computerized service; (iv) upon a first-ever access of the third user to the computerized service via the second type of computing platform, determining whether or not user interactions of the third user with the computerized service via the second type of computing platform exhibit said second behavioral trait; (v) based on the determining of step (iv), detecting whether said third user is an authorized user or an attacker.

In some embodiments, the determining of step (iii) is performed prior to the third user ever accessing the computerized service via the second type of computing platform.

In some embodiments, the method may comprise: based on steps (i) and (ii) and (iii), and prior to the third user ever accessing the computerized service via the second type of computing platform: generating a differentiation rule that predicts that the third user, during his first-ever access to the computerized service via the second type of computing platform, would perform user interactions that exhibit said second behavioral trait.

In some embodiments, the method may comprise: based on steps (i) and (ii) and (iii), and prior to the third user ever accessing the computerized service via the second type of computing platform: generating a differentiation rule that predicts that the third user, during his first-ever access to the computerized service via the second type of computing platform, would perform user interactions that exhibit said second behavioral trait which was never yet observed in any monitored user interactions of the third user.

In some embodiments, the method may comprise: upon the first-ever access of the third user to the computerized service via the second type of computing platform, if it is determined that user interactions of the third user with the computerized service via the second type of computing platform do not exhibit said second behavioral trait, then determining that said third user is an attacker.

In some embodiments, the method may comprise: (a) monitoring user interactions of the first user and the second user and the third user during multiple usage sessions with the computerized service; (b) determining that the user interactions of the first user, the user interactions of the second user, and the user interactions of the third user, all exhibit a same first behavioral trait when the first, the second and the third user are utilizing a non-portable computing device to access the computerized service; (c) determining that the user interactions of the first user and the user interactions of the second user, exhibit a same second behavioral trait when the first and the second user are utilizing a portable computing device to access the computerized service; (d) upon a first-ever access of the third user to the computerized service via a portable computing device, determining whether or not user interactions of the third user with the computerized service via the portable computing device exhibit said second behavioral trait; (e) based on the determining of step (iv), detecting whether said third user is an authorized user or an attacker.

In some embodiments, the determining of step (d) is performed prior to the third user ever accessing the computerized service via any portable computing device.

In some embodiments, the method may comprise: based on steps (a) and (b) and (c), and prior to the third user ever accessing the computerized service via any portable computing device: generating a differentiation rule that predicts that the third user, during his first-ever access to the computerized service via any portable computing device, would perform user interactions that exhibit said second behavioral trait.

In some embodiments, the method may comprise: based on steps (a) and (b) and (c), and prior to the third user ever accessing the computerized service via any portable computing device: generating a differentiation rule that predicts that the third user, during his first-ever access to the computerized service via any portable computing device, would perform user interactions that exhibit said second behavioral trait which was never yet observed in any monitored user interactions of the third user.

In some embodiments, the method may comprise: upon the first-ever access of the third user to the computerized service via any portable computing device, if it is determined that user interactions of the third user with the computerized service via a portable computing device do not exhibit said second behavioral trait, then determining that said third user is an attacker.

In some embodiments, the method may comprise: (a) monitoring user interactions of the first user and the second user and the third user during multiple usage sessions with the computerized service; (b) determining that the user interactions of the first user, the user interactions of the second user, and the user interactions of the third user, all exhibit a same first behavioral trait when the first, the second and the third user are utilizing a mobile computing device to access the computerized service; (c) determining that the user interactions of the first user and the user interactions of the second user, exhibit a same second behavioral trait when the first and the second user are utilizing a non-mobile computing device to access the computerized service; (d) upon a first-ever access of the third user to the computerized service via a portable computing device, determining whether or not user interactions of the third user with the computerized service via the non-mobile computing device exhibit said second behavioral trait; (e) based on the determining of step (iv), detecting whether said third user is an authorized user or an attacker.

In some embodiments, the determining of step (d) is performed prior to the third user ever accessing the computerized service via any non-mobile computing device.

In some embodiments, the method may comprise: based on steps (a) and (b) and (c), and prior to the third user ever accessing the computerized service via any non-mobile computing device: generating a differentiation rule that predicts that the third user, during his first-ever access to the computerized service via any non-mobile computing device, would perform user interactions that exhibit said second behavioral trait.

In some embodiments, the method may comprise: based on steps (a) and (b) and (c), and prior to the third user ever accessing the computerized service via any non-mobile computing device: generating a differentiation rule that predicts that the third user, during his first-ever access to the computerized service via any non-mobile computing device, would perform user interactions that exhibit said second behavioral trait which was never yet observed in any monitored user interactions of the third user.

In some embodiments, the method may comprise: upon the first-ever access of the third user to the computerized service via any non-mobile computing device, if it is determined that user interactions of the third user with the computerized service via a non-mobile computing device do not exhibit said second behavioral trait, then determining that said third user is an attacker.

In some embodiments, the determining of step (ii) comprises: determining that the user interactions of the user interactions of the first user, the user interactions of the second user, and the user interactions of the third user, all exhibit a same first behavioral trait which is derived from a common physiological feature that is common to the first and second and third users, when the first, the second and the third user are utilizing a first type of computing platform to access the computerized service.

In some embodiments, the method may comprise: (a) analyzing user interactions performed by the first user, the second user, and the third user when they interact with the computerized service via a non-portable computer; (b) based on the analyzing of step (a), determining that the first user, the second user, and the third user all have a particular physiological characteristic; (c) analyzing user interactions performed by the first user and the second user, when they interact with the computerized service via a portable computing device; (d) based on the analyzing of step (c), determining that the first user and the second user perform a particular gesture based on said particular physiological characteristic when they access the computerized service via the portable computing device; (e) prior to a first-ever access of the third user to the computerized service via a portable computing device, generating a prediction rule that user interactions of the third user via the portable computing device would exhibit said particular physiological characteristic; (f) upon the first-ever access of the third user to the computerized service via a portable computing device, if user interactions of the third user via the portable computing device do not exhibit said particular physiological characteristic, then determining that the third user is an attacker.

In some embodiments, the method may comprise: (a) analyzing user interactions performed by the first user, the second user, and the third user when they interact with the computerized service via a desktop computer; (b) based on the analyzing of step (a), determining that the first user, the second user, and the third user all have a particular physiological characteristic; (c) analyzing user interactions performed by the first user and the second user, when they interact with the computerized service via a smartphone; (d) based on the analyzing of step (c), determining that the first user and the second user perform a particular gesture based on said particular physiological characteristic when they access the computerized service via smartphone; (e) prior to a first-ever access of the third user to the computerized service via smartphone, generating a prediction rule that user interactions of the third user via smartphone would exhibit said particular physiological characteristic; (f) upon the first-ever access of the third user to the computerized service via smartphone, if user interactions of the third user with the computerized service via smartphone do not exhibit said particular physiological characteristic, then determining that the third user is an attacker.

In some embodiments, the method may comprise: (a) analyzing user interactions performed by the first user, the second user, and the third user when they interact with the computerized service via smartphone; (b) based on the analyzing of step (a), determining that the first user, the second user, and the third user all have a particular physiological characteristic; (c) analyzing user interactions performed by the first user and the second user, when they interact with the computerized service via tablet; (d) based on the analyzing of step (c), determining that the first user and the second user perform a particular gesture based on said particular physiological characteristic when they access the computerized service via tablet; (e) prior to a first-ever access of the third user to the computerized service via smartphone, generating a prediction rule that user interactions of the third user via tablet would exhibit said particular physiological characteristic; (f) upon the first-ever access of the third user to the computerized service via smartphone, if user interactions of the third user with the computerized service via tablet do not exhibit said particular physiological characteristic, then determining that the third user is an attacker.

In some embodiments, the method may comprise: (a) analyzing user interactions performed by the first user, the second user, and the third user when they interact with the computerized service via tablet; (b) based on the analyzing of step (a), determining that the first user, the second user, and the third user all have a particular physiological characteristic; (c) analyzing user interactions performed by the first user and the second user, when they interact with the computerized service via smartphone; (d) based on the analyzing of step (c), determining that the first user and the second user perform a particular gesture based on said particular physiological characteristic when they access the computerized service via smartphone; (e) prior to a first-ever access of the third user to the computerized service via smartphone, generating a prediction rule that user interactions of the third user via smartphone would exhibit said particular physiological characteristic; (f) upon the first-ever access of the third user to the computerized service via smartphone, if user interactions of the third user with the computerized service via smartphone do not exhibit said particular physiological characteristic, then determining that the third user is an attacker.

Modules, elements, systems and/or sub-systems described herein may be implemented by using hardware components and/or software modules; for example, utilizing a processor, a controller, an Integrated Circuit (IC), a logic unit, memory unit, storage unit, input unit, output unit, wireless modem or transceiver, wired modem or transceiver, internal or external power source, database or data repository, Operating System (OS), drivers, software applications, or the like. Some embodiments may utilize client/server architecture, distributed architecture, peer-to-peer architecture, and/or other suitable architectures; as well as one or more wired and/or wireless communication protocols, links and/or networks.

Although portions of the discussion herein relate, for demonstrative purposes, to wired links and/or wired communications, some embodiments of the present invention are not limited in this regard, and may include one or more wired or wireless links, may utilize one or more components of wireless communication, may utilize one or more methods or protocols of wireless communication, or the like. Some embodiments may utilize wired communication and/or wireless communication.

Functions, operations, components and/or features described herein with reference to one or more embodiments of the present invention, may be combined with, or may be utilized in combination with, one or more other functions, operations, components and/or features described herein with reference to one or more other embodiments of the present invention.

While certain features of the present invention have been illustrated and described herein, many modifications, substitutions, changes, and equivalents may occur to those skilled in the art. Accordingly, the claims are intended to cover all such modifications, substitutions, changes, and equivalents.

What is claimed is:

1. A method comprising:
   (a) monitoring input-unit interactions of a plurality of users, wherein each user of said plurality of users separately utilizes an electronic device to access a computerized service;
   (b) clustering a first user, a second user, and a third user of said plurality of users into a particular cluster of users whose input-unit interactions exhibit a particular behavioral trait when they interact with said computerized service through a portable electronic device;

(c) subsequently, detecting that the first user and the second user, access said computerized service via a non-portable electronic device, in a manner that exhibits a second, different, behavioral trait;

(d) determining that the third user is also expected to exhibit said second behavioral trait when the third user accesses said computerized service via a non-portable electronic device;

(e) in a particular usage session, in which said third user firstly-ever accesses the computerized service via a non-portable electronic device: if said particular usage session of said third user, does not exhibit said second behavioral trait that was determined in steps (c) and (d), then, determining that said particular usage session is attributed to a cyber-attacker and not to said third user;

wherein the method comprises:
based on steps (a) and (b) and (c) and (d), and prior to the third user ever accessing the computerized service via a non-portable electronic device,
generating a differentiation rule that predicts that the third user, during his first-ever access to the computerized service via the non-portable electronic device, would perform user interactions that exhibit said second behavioral trait which was never yet observed in any monitored input-units interactions of the third user.

2. The method of claim 1, wherein the determining of step (d) is performed prior to the third user ever accessing the computerized service via a non-portable electronic device.

3. A method comprising:
(a) monitoring input-unit interactions of a plurality of users, wherein each user of said plurality of users separately utilizes an electronic device to access a computerized service;

(b) clustering a first user, a second user, and a third user of said plurality of users, into a particular cluster of users whose input-unit interactions exhibit a particular behavioral trait when they interact with said computerized service through a non-portable electronic device;

(c) subsequently, detecting that the first user and the second user, access said computerized service via a portable electronic device, in a manner that exhibits a second, different, behavioral trait;

(d) determining that the third user is also expected to exhibit said second behavioral trait when the third user accesses said computerized service via a portable electronic device;

(e) in a particular usage session, in which said third user firstly-ever accesses the computerized service via a portable electronic device: if said particular usage session of said third user, does not exhibit said second behavioral trait that was determined in steps (c) and (d), then, determining that said particular usage session is attributed to a cyber-attacker and not to said third user;

wherein the method comprises:
based on steps (a) and (b) and (c) and (d), and prior to the third user ever accessing the computerized service via a non-portable electronic device,
generating a differentiation rule that predicts that the third user, during his first-ever access to the computerized service via the non-portable electronic device, would perform user interactions that exhibit said second behavioral trait which was never yet observed in any monitored input-units interactions of the third user.

4. The method of claim 3, wherein the determining of step (c) is performed prior to the third user ever accessing the computerized service via a non-portable electronic device.

5. A process comprising:
(a) monitoring input-unit interactions of a plurality of users, wherein each user of said plurality of users separately utilizes an electronic device to access a computerized service;

(b) clustering a first user, a second user, and a third user of said plurality of users, into a particular cluster of users whose input-unit interactions exhibit a particular behavioral trait when they interact with said computerized service through a smartphone;

(c) subsequently, detecting that the first user and the second user, access said computerized service via a computer, in a manner that exhibits a second, different, behavioral trait;

(d) determining that the third user is also expected to exhibit said second behavioral trait when the third user accesses said computerized service via a computer;

(e) in a particular usage session, in which said third user firstly-ever accesses the computerized service via a computer: if said particular usage session of said third user, does not exhibit said second behavioral trait that was determined in steps (c) and (d), then, determining that said particular usage session is attributed to a cyber-attacker and not to said third user;

wherein the process comprises:
based on steps (a) and (b) and (c) and (d), and prior to the third user ever accessing the computerized service via a computer,
generating a differentiation rule that predicts that the third user, during his first-ever access to the computerized service via a computer, would perform user interactions that exhibit said second behavioral trait which was never yet observed in any monitored input-units interactions of the third user.

6. The process of claim 5, wherein the determining of step (c) is performed prior to the third user ever accessing the computerized service via a computer.

7. A process comprising:
(a) monitoring input-unit interactions of a plurality of users, wherein each user of said plurality of users separately utilizes an electronic device to access a computerized service;

(b) clustering a first user, a second user, and a third user of said plurality of users, into a particular cluster of users whose input-unit interactions exhibit a particular behavioral trait when they interact with said computerized service through a first-type of end-user-device;

(c) subsequently, detecting that the first user and the second user, access said computerized service via a second-type of end-user device, in a manner that exhibits a second, different, behavioral trait;

(d) determining that the third user is also expected to exhibit said second behavioral trait when the third user accesses said computerized service via said second-type of end-user-device;

(e) in a particular usage session, in which said third user firstly-ever accesses the computerized service via said second-type of end-user-device: if said particular usage session of said third user; does not exhibit said second behavioral trait that was determined in steps (c) and (d), then, determining that said particular usage session is attributed to a cyber-attacker and not to said third user; wherein the process comprises:
based on steps (a) and (b) and (c) and (d), and prior to the third user ever accessing he computerized service via said second-type of end-user-device,
generating a differentiation rule that predicts that the third user, during his first-ever access to the computerized service via said second-type of end-user-device, would perform user interactions that exhibit said second behavioral trait which was never yet observed in any monitored input-units interactions of the third user.

8. The process of claim 7, wherein the determining of step (c) is performed prior to the third user ever accessing the computerized service via said second-type of end-user-device.

\* \* \* \* \*